Jan. 31, 1961  S. A. McGAVERN  2,969,657
FLEXIBLE COUPLING
Filed April 27, 1959  2 Sheets-Sheet 1
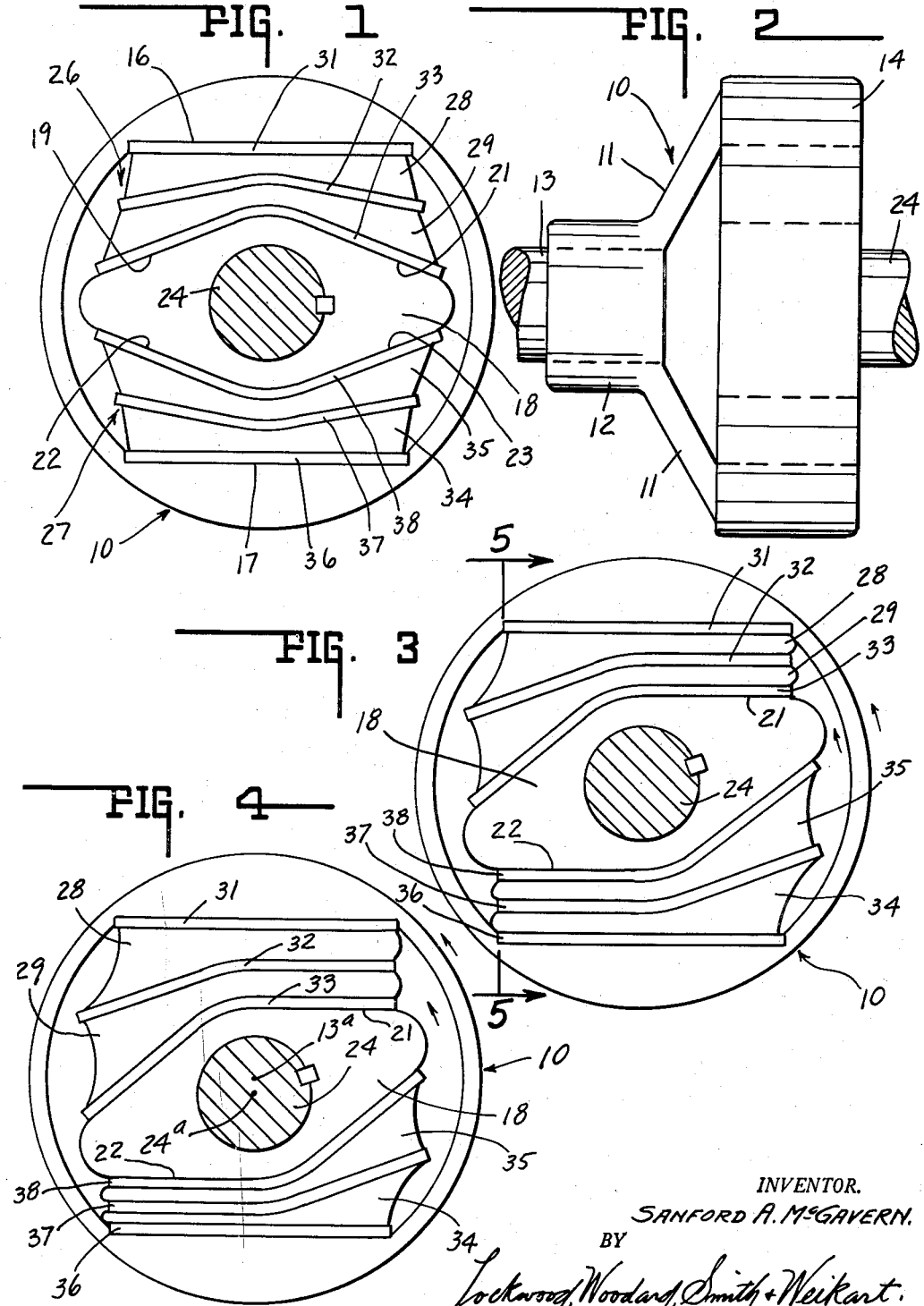
INVENTOR.
SANFORD A. McGAVERN.
BY
Lockwood, Woodard, Smith & Weikart.
ATTORNEYS.

Jan. 31, 1961  S. A. McGAVERN  2,969,657
FLEXIBLE COUPLING
Filed April 27, 1959  2 Sheets-Sheet 2
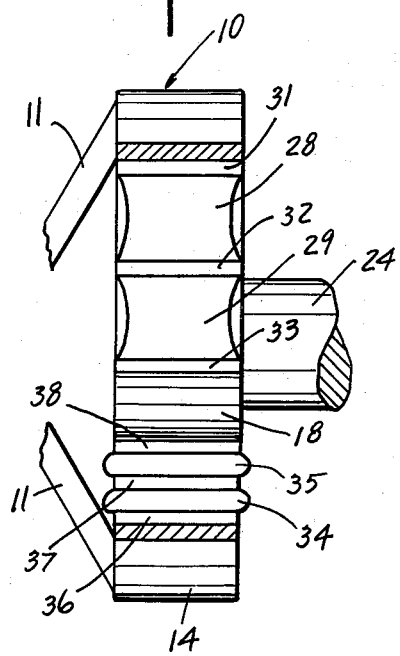
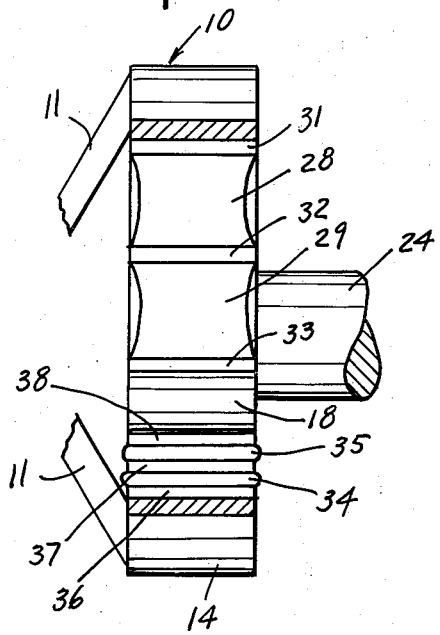
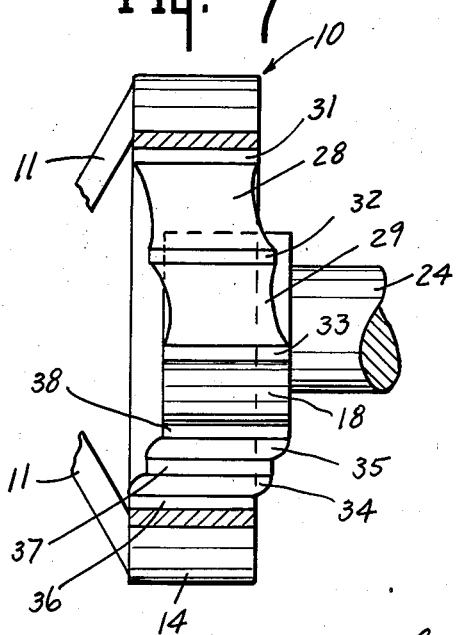
INVENTOR.
SANFORD A. McGAVERN.
BY
Lockwood, Woodard, Smith & Weikart.
ATTORNEYS.

United States Patent Office 2,969,657
Patented Jan. 31, 1961

2,969,657
FLEXIBLE COUPLING

Sanford A. McGavern, Indianapolis, Ind., assignor to Schwitzer Corporation, Indianapolis, Ind., a corporation Filed Apr. 27, 1959, Ser. No. 809,272
3 Claims. (Cl. 64—11)

This invention relates generally to power transmission devices and in particular to a flexible coupling for transferring rotary motion from a driving to a driven shaft.

Flexible couplings, particularly those used in industrial applications must be able to accommodate various shaft conditions such as angular misalignment of the coupled shafts, parallel misalignment thereof and end float or relative motion of the coupled shafts along a line parallel with their axes. These misalignments must be accommodated by the coupling without generating excessive heat therein and without throwing harmful forces on the shaft bearings either radially or in the direction of the shaft axes. A further requirement is that the flexing element of the coupling be replaceable quickly without requiring loosening of the connections to either the driving or driven elements. An ideal coupling of the type referred to should also be capable of acting as a bearing for one of the shafts, that is, it should be adaptable to "floating shaft" applications.

The coupling of the present invention includes a first element adapted to be rotationally locked to one of the shafts to be coupled. This element is formed to provide spaced planar surfaces which are radially spaced from the shaft axis and face each other in diametrically opposed relation. A second element having inclined marginal faces is rotationally locked to the other coupled shaft and this element is positioned between the planar surfaces provided by the first element. Interposed between the planar surfaces of the first element and the marginal inclined surfaces of the second element are a plurality of flexible members which are separated by thin plates, or interleaves. Distortion or flexing of the elements permits accommodation of the various types of shaft misalignment or relative movement.

It is the primary object of the present invention to provide a flexible coupling capable of accommodating, within relatively wide limits, the various types of shaft misalignment and relative motion.

It is a further object of the present invention to provide a coupling of the type described which is capable of functioning as a bearing for one of the coupled shafts.

A further object of the present invention is to provide a coupling of the type described which has a non-linear spring rate or force-deflection ratio and thus minimizes the starting load placed on the driving element.

A further object of the present invention is to provide a coupling of the type described wherein the flexible elements can be quickly and conveniently replaced without loosening the connections to either the driven or driving elements.

These and other objects will become apparent as the description proceeds with reference to the accompanying drawings in which:

Fig. 1 is an end view of a device deposing the present invention.

Fig. 2 is a side view of the coupling device.

Fig. 3 is an end view of the coupling device under no misalignment but under heavy torque.

Fig. 4 is an end view of the coupling device under parallel misalignment and heavy torque.

Fig. 5 is a side view of the coupling device illustrating no misalignment of the shafts but carrying heavy torque load, the view being partly in section along the line 5—5 of Fig. 3.

Fig. 6 is a view similar to Fig. 5 but illustrating parallel misalignment of the shafts and heavy torque loading thereof, the view being partly in section.

Fig. 7 is a side view of the coupling device illustrating axial displacement of one of the shafts and torque loading thereof, the view being partly in section.

Referring initially to Figs. 1 and 2, the coupling device includes a first member indicated generally at 10 having legs 11 extending from a hub 12. The hub is keyed or otherwise rotationally locked to a driven shaft 13.

The legs 11 of the member 10 support a ring or annular member 14 which is formed to provide diametrically opposed planar surfaces 16 and 17 on opposite sides of the driven shaft axis. The coupling device further includes a second member 18 having a parallelogram configuration. The upper and lower side marginal areas of the member 18 thus provide oppositely inclined upper surfaces 19 and 21 and oppositely inclined lower surfaces 22 and 23. The member 18 is keyed or otherwise rotationally locked to a driving shaft 24.

Interposed between the surfaces 16 and 19—21 is a flexible assembly indicated generally at 26. Interposed between the surfaces 17 and 22—23, is an identical flexible assembly 27.

The flexible assembly 26 includes elements 28 and 29 which are suitably secured to the plates or leaves 31, 32 and 33. The leaves may be formed of metal and the elements 28 and 29 are formed of a flexible material such as rubber or a suitable plastic. The flexible assembly is installed by driving it between the surfaces 16 and 19—21, the rubber elements 28 and 29 being thereby compressed somewhat, this pre-stressing of the elements insuring the maximum service life for cyclic flexures. The flexible assembly 26 may be retained in place on the members 10 and 18 by suitable removable clips (not shown).

The flexible assembly 27 is identical to the member 26 and includes rubber or similar elastic elements 34 and 35 which are secured to the plates or leaves 36, 37 and 38.

In operation, as may be seen in Fig. 3, portions of the flexible assemblies 26 and 27 will be placed in compression, while other portions of the assemblies will be under tension and shear, assuming that the rotation of the shafts is counterclockwise as viewed in Fig. 3. Fig. 3 illustrates the relative position of the parts when there is no misalignment of the drive and driven shafts and when the coupling is under full torque. For small angular displacements of the member 18 with relation to the member 10, it will be evident that the elastic elements 28, 29, 34 and 35 will be stressed primarily in shear but for a larger angular displacement they will be stressed in tension, shear and compression. The spring rate or force-deflection ratio of the coupling is thus non-linear and prevents the application of large starting loads to the drive shaft.

Referring now to Fig. 4, the elements are shown in the positions assumed when the axis of the shaft 24, indicated at 24a, is displaced somewhat downwardly from the axis of the shaft 13, indicated at 13a. Under these conditions, less compressive stress will be exerted upon the elements 28 and 29, and these will generally assume the dimensions indicated in Fig. 4 to accommodate the misalignment of the shafts 13 and 24. Fig. 6 is a side view of the elements in the positions illustrated in Fig. 4.

Fig. 7 indicates the position assumed by the elements of the coupling when the shaft 24 is displaced outwardly with relation to the coupling member 10. Under these conditions, assuming maximum torque, the elastic elements will be stressed as indicated in Fig. 3 but will additionally be stressed transversely in shear, their consequent deformation accommodating any floating or endwise movement of the shafts.

While not illustrated, it will be understood that any angular misalignment between the shafts will be accommodated, within limits, by the consequent cocking deformation of the elastic elements.

The flexible members may be removed from the coupling device for replacement merely by removal of the clips (not shown) and by driving the flexible members from their assembled position by application of a suitable tool through the aperture bounded by the legs 11 of the member 12. It will also be apparent that the coupling may be utilized to provide one of the bearing supports for one of the two shafts and is thus adaptable for floating shaft applications.

While there has been described herein flexible members having only a singular interleaf (32 or 37), it will be understood that flexible members having a plurality of interleaves might also be used under certain power transmission conditions.

While the invention has been disclosed and described in some detail in the drawings and foregoing description, they are to be considered as illustrative and not restricted in character, as other modifications may readily suggest themselves to persons skilled in this art and within the broad scope of the invention, reference being had to the appended claims.

The invention claimed is:

1. A coupling device for effecting power transmission between driving and driven shafts, said device including a first member adapted to be rotationally locked to the driven shaft, said member being formed to provide diametrically opposed planar surfaces on opposite sides of the driven shaft axis, a second member having oppositely inclined side margins and rotationally locked on the driving shaft, said second element being positioned so that its inclined side margins face the planar surfaces of said first element, and a flexible member extending between each of the planar surfaces of said first element and the inclined side margins of said second element, each of said flexible members comprising a plurality of elastic elements arranged in stacked relation, end leaves secured to the end surfaces of the element stack and an interleaf interposed between each of said elastic elements, the end leaves having a configuration permitting them to be disposed contiguous to said planar surfaces and to said oppositely inclined surfaces, whereby deformation of said elastic elements permits said coupling device to accommodate various misalignments between said shafts as well as relative endwise motion therebetween.

2. A coupling device for effecting power transmission between driving and driven shafts, said device including a first member adapted to be rotationally locked to one of said shafts, said member being formed to provide diametrically opposed planar surfaces on opposite sides of the axis of said one shaft, a second member having oppositely inclined side margins and rotationally locked on the other of said shafts, said second element being positioned so that its inclined side margins face the planar surfaces of said first element, and a flexible member extending between each of the planar surfaces of said first element and the inclined side margins of said second element, each of said flexible members comprising a plurality of elastic elements arranged in stacked relation, end leaves secured to the end surfaces of the element stack and an interleaf interposed between each of said elastic elements, the end leaves having a configuration permitting them to be disposed contiguous to said planar surfaces and to said oppositely inclined surfaces, whereby deformation of said elastic elements permits said coupling device to accommodate various misalignments between said shafts as well as relative endwise motion therebetween.

3. A coupling device for effecting power transmission between driving and driven shafts, said device including a first member adapted to be rotationally locked to one of said shafts, said member being formed to provide diametrically opposed surfaces on opposite sides of the axis of said one shaft, a second member having spaced side margins and rotationally locked on the other of said shafts, said second element being positioned so that its side margins face the opposed surfaces of said first element, and a flexible member extending between each of the opposed surfaces of said first element and the side margins of said second element, each of said flexible members comprising a plurality of elastic elements arranged in stacked relation, end leaves secured to the end surfaces of the element stack and an interleaf interposed between each of said elastic elements, deformation of said elastic elements under stress permitting said coupling device to accommodate various misalignments between said shafts as well as relative endwise motion therebetween.

References Cited in the file of this patent

UNITED STATES PATENTS

| 2,327,389 | Bagnall | Aug. 24, 1943 |
| 2,337,287 | Williams | Dec. 21, 1943 |
| 2,363,469 | Goldschmidt | Nov. 21, 1944 |

FOREIGN PATENTS

| 458,167 | Canada | July 19, 1949 |